United States Patent [19]

Breite

[11] 4,055,364
[45] Oct. 25, 1977

[54] LIFTING DEVICE FOR BATTERIES AND THE LIKE

[76] Inventor: Max Breite, 810 Spring Ave., St. Charles, Mo. 63301

[21] Appl. No.: 725,867

[22] Filed: Sept. 23, 1976

[51] Int. Cl.² ............................................. B65G 7/12
[52] U.S. Cl. .................................. 294/63 B; 294/16; 294/62; 294/92
[58] Field of Search .................. 294/63 B, 16, 28, 31, 294/62, 103, 92, 99, 104, 106, 118; 224/45 F

[56] References Cited

U.S. PATENT DOCUMENTS

| | | | |
|---|---|---|---|
| 1,779,291 | 10/1930 | Richardson | 294/63 B |
| 2,778,668 | 1/1957 | Tomek et al. | 294/63 B |

*Primary Examiner*—James B. Marbert
*Attorney, Agent, or Firm*—Gravely, Lieder & Woodruff

[57] ABSTRACT

A lifting tool for batteries and the like includes first and second members each having an upright end leg provided with a gripping shoe. The leg of the first member merges into a horizontal handle, while the leg of the second member merges into a connecting portion which extends under the handle of the first member and is connected to the leg of the first member at a pivot pin. This enables the two members to pivot relative to each other. The pivot pin extends through a slot in the connecting portion of the second member to permit the two sections to shift relative to each other to vary the spacing between the gripping shoes. The legs are spread apart by pressing the handle toward the connecting portion, and in this condition the tool is installed over the object to be lifted with the shoes opposite the end walls of the object. When the tool is lifted upwardly at its handle, the gripping legs move together, causing the shoes to bear against the end walls of the object. The weight of the object coupled with the leverage developed between the gripping members results in a sizeable gripping force on the object.

10 Claims, 3 Drawing Figures

U.S. Patent   Oct 25, 1977   4,055,364
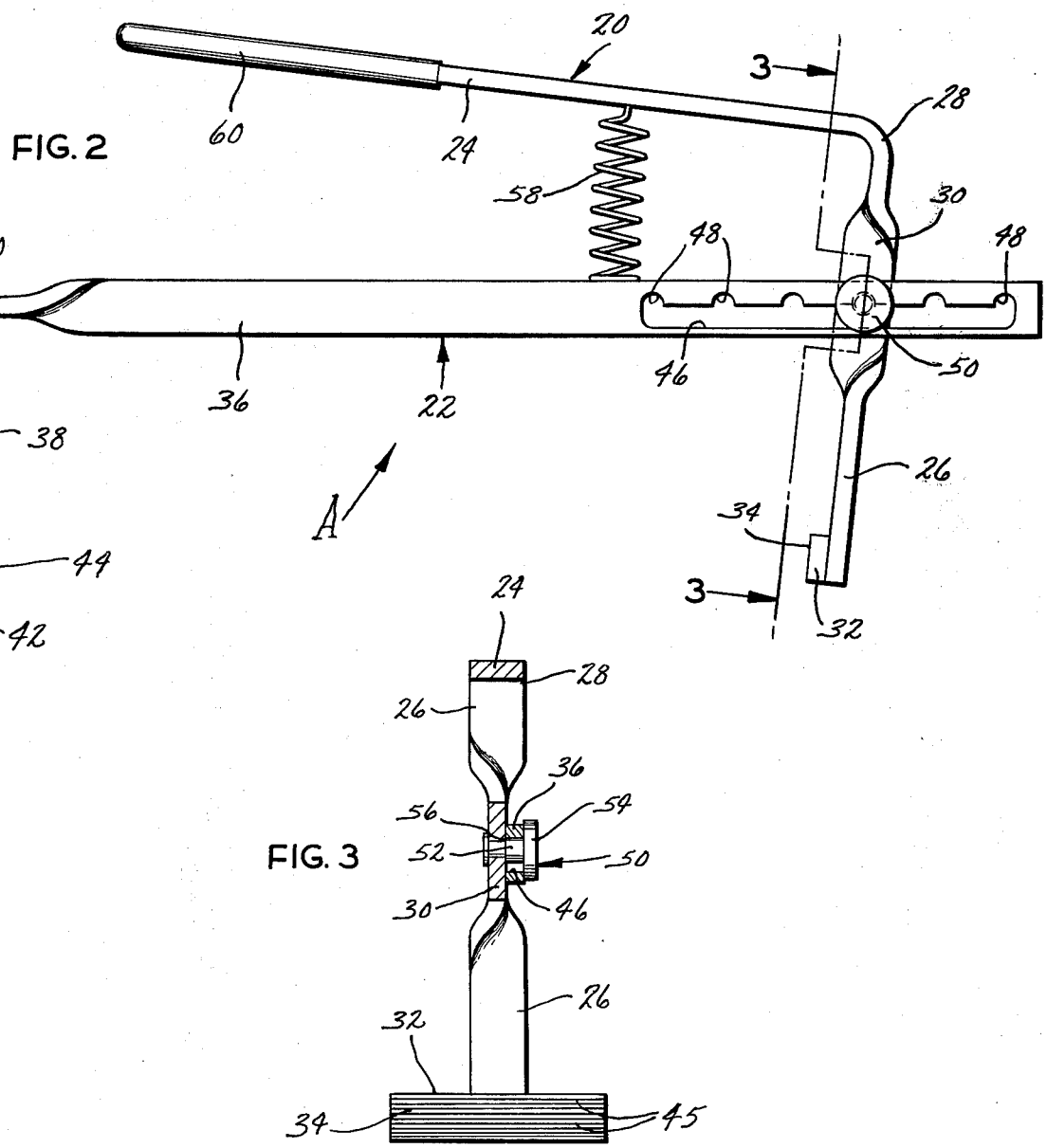

LIFTING DEVICE FOR BATTERIES AND THE LIKE

BACKGROUND OF THE INVENTION

The invention relates in general to lifting devices and more particularly to a tool for lifting and carrying batteries and similar objects.

Automotive as well as marine batteries are particularly difficult to remove from their mounts, primarily because of their extreme weight and the absence of surface areas at which to obtain a good grip. Such batteries are equally difficult to carry from one location to another, for substantially the same reasons.

While lifting devices have been developed for removing batteries from and installing them in engine compartments, most of these devices grip the terminals of the batteries and accordingly must be made from dielectric materials which are not very strong. Furthermore, since the entire weight of the battery is suspended from the terminals, the terminals stand a good chance of being wrenched loose from the battery case. Other lifting devices grip the sides of the battery case, but many of these can accommodate batteries of only one size, and those which that are capable of accommodating batteries of varying size are unduly complicated.

SUMMARY OF THE INVENTION

One of the principal objects of the present invention is to provide a device having the capability of gripping the side walls of a battery case or similar object so that the object may be easily lifted and carried about. Another object is to provide a device of the type stated which enables one to carry a battery without having his clothing soiled by grease and battery acid. A further object is to provide a device of the type stated which is adjustable so that it can accommodate batteries or similar objects of varying size. An additional object is to provide a device of the type stated which is simple in construction and easy to operate. Still another object is to provide a device of the type stated in which the load carrying parts are made entirely from a durable metal such as steel. Yet another object is to provide a device of the type stated which will accommodate new batteries having side-mounted terminals. These and other objects and advantages will become apparent hereinafter.

DESCRIPTION OF THE DRAWINGS

In the accompanying drawings which form part of the specification and wherein like numerals and letters refer to like parts wherever they occur.

FIG. 1 is a perspective view of a battery gripped by and suspended from the lifting device of the present invention;

FIG. 2 is a side elevational view of the lifting device; and

FIG. 3 is a sectional view taken along line 3—3 of FIG. 2 and showing one of the end legs as well as the pivot point between the two members of the lifting device.

DETAILED DESCRIPTION

Referring now to the drawings (FIG. 1), A designates a lifting and carrying device for a battery B. The battery B has the usual rectangular configuration, and includes a case 2 formed from vertical side walls 4, end walls 6, and top and bottom walls 8 and 10 connected to the side and end walls 4 and 6. The top wall 8 has two terminals 12 projecting upwardly from it. The carrying device A grips the battery B at the end walls 6 of its case 2, and once the battery B is raised, its own weight assists in maintaining a tight and secure grip on it.

The carrying device A basically includes two gripping members 20 and 22 (FIG. 2) which are pivotally connected to each other and are for the most part formed from bar stock of rectangular cross-sectional configuration. As such, the bar stock has major surface areas and minor surface areas with the minor surface areas forming in effect the side edges of the bar stock. The bar stock may be metal, and is preferably steel.

The first gripping member 20 (FIG. 2) includes a handle 24 which merges into an end leg 26 at a right angle bend 28 in the bar stock. At the handle 24 the bar stock is oriented with its major surface areas horizontal, while at the leg 26 the major surface areas are vertical and for the most part perpendicular to the longitudinal axis of the handle 24. However slightly below the bend 28, the end leg 26 is provided with an intermediate portion 30 where the bar stock of the leg is twisted 90° so that the major surface areas thereof a parallel to the longitudinal axis of the handle 24. The extreme lower end of the leg 26 has a gripping shoe 32 attached firmly to it, and that shoe has a planar gripping face 34 which is oriented cross wise with respect to the longitudinal axis of the handle 24.

The second gripping member 22 (FIG. 2), on the other hand, has a top connecting portion 36 which is located beneath the handle 24 and merges into an end leg 38 which is located opposite to, but spaced from, the end leg 26 on the first gripping member 20. The connecting portion 36 crosses the intermediate portion 30 of the end leg 26 of the first gripping member 20 and in so doing extends in the same direction as the handle 30 and may be parallel to the handle 30. Unlike the handle 24 which has the major surface areas of the bar stock oriented horizontally, the major surface areas for the bar stock at the connecting portion 36 are oriented vertically, and accordingly major surface areas of the connecting portion 36 of the second member 22 and of the intermediate portion 30 for the leg 26 of first member 20 are parallel. Indeed their major surface areas abut where the two portions 30 and 36 cross. At this location, the two gripping members 20 and 22 of the device A pivot relative to each other.

At that end of the horizontal connecting portion 36 which is located beneath the free end of the handle 24, the connecting portion 36 is twisted 90° so that beyond the twist its major surface areas are horizontal. Immediately beyond the twist the connecting portion 36 merges into the end leg 38 at a 90° bend 40. Hence, the major surface areas of the bar stock at the end leg 38 are generally parallel to the major surfaces of the leg 26 on the first member 20. The end leg 38 has a gripping shoe 42 attached firmly to it, and that shoe has a planar gripping face 44 which is presented toward and is generally parallel to the gripping face 34 of the shoe 32 on the member 20.

The two gripping shoes 32 and 42 at their respective gripping faces 34 and 44 have shallow closely spaced grooves 45 (FIG. 3) which extend in the horizontal direction, that is longitudinally of the shoes 32 and 42. The grooves 45 increase the friction at the gripping faces 34 and 44.

That section of the connecting portion 36 which is located at the twisted intermediate portion 30 for the first gripping member 20 is provided with an elongated slot 46 (FIG. 2) which is substantially longer than the transverse dimension of the intermediate portion 30. The lower margin of the slot 46 is perfectly straight, while the upper margin is interrupted by a plurality of equally spaced notches 48 which open into the major portion of the slot 46. A notch 48 is at each end of the slot 46.

The connecting portion 36 of the second gripping member 22 is connected to the intermediate portion 30 of the first gripping member 20 by a shoulder rivet 50 (FIG. 3) which is secured in the intermediate portion 30. The rivet 50 has a shank 52 which extends through the slot 46 of the connecting portion 36, with the diameter of the shank 52 being slightly less than the width of the slot 46 so that the rivet 50 can slide along the slot 46. The notches 48, on the other hand, generally conform to the curvature of the shank 52. In addition to the shank 52, the rivet 50 has a head 54 which is attached to the end of the shank 52 and overlies one of the major surface areas of the connecting portion 36. The diameter of the head 54 is somewhat greater than the width of the slot 46, even at the notches 48 so that the member 22 is incapable of being detached from the member 20. At the other end of the shank 52 is a shoulder 56 and the portion of the rivet 58 located beyond the shoulder 56 is set firmly into the twisted intermediate portion 30 of the first gripping member 20. Thus, the connecting portion 36, and along with it the entire second gripping member 22, is free to pivot relative to the first gripping member 20. Moreover, the connecting portion 36 may be moved relative to end leg 26 of the first gripping member 20 to adjust the spacing between the gripping shoes 32 and 42. In that instance the rivet 50 is displaced from one notch 48 to another.

Interposed between the handle 24 of the first gripping member 20 and the connecting portion 36 of the second gripping member 22 is a coil-type compression spring 58. The upper end of the spring 58 is attached to the handle 24, and while the lower end aligns with and will bear against the connecting portion 36, it is completely detached from the connecting portion 36 so that the handle 24 may be moved away from and also longitudinally with respect to the connecting portion 36 without interference from the spring 58. When the lower end of the spring 58 is against the connecting portion 36, the handle 24 and connecting portion 36 are close to parallel.

The handle 24 has a plastic grip 60 fitted over its free end.

OPERATION

In using the device A to remove a battery B from its mounting, the leads to the battery B are first disconnected from the terminals 12 of the battery B, and then the mounting clamps are detached. Then the members 20 and 22 of the device A are adjusted relative to each other such that the spacing between the gripping faces 34 and 44 of the respective gripping shoes 32 and 42 when the handle 24 is generally parallel to the connecting portion 36 is about equal to or slightly less than the distance between the end walls 6 of the battery B. This is achieved by moving the first gripping member 20 relative to the second gripping portion 22 and in so doing the rivet 50 of the former moves through the slot 46 of the latter. The rivet 50 is moved from one notch 48 to the next until the proper spacing of the gripping shoes 32 and 42 is achieved.

Once the rivet 50 of the gripping member 20 is in the proper notch 48 of the slot 46 in the second gripping member 22, the user places his hand around the grip 60 of the handle 24 and also around the connecting portion 36 and squeezes the two together against the restoring force exerted by the spring 58. This spreads the gripping shoes 32 and 42 apart and the spacing between them should exceed the distance between the end walls 6 of the battery B. With the two gripping shoes 32 and 42 so disposed, the device A is lowered over the battery B until the shoes 32 and 42 are located opposite the end walls 6 and the connecting portion 36 extends over the top wall 8. Next the connecting portion 36 is released, and this causes the handle 24 to pivot away from the connecting portion 36. As a result the gripping shoes 32 and 42 move together and their gripping faces 34 and 44 come against and frictionally grip the end walls 6 of the battery B.

Now the battery B is removed from its mounting merely by lifting upwardly on the handle 24 (FIG. 1). This may be done with one or two hands, the handle 24 being most easily grasped at the plastic grip 60 on it. As the lifting force is applied to the handle 24, the first gripping member 20 pivots slightly relative to the second gripping member 22 at axis of the rivet 50, and as a result the gripping shoe 32 is urged toward the gripping shoe 42. In other words, the rivet 50 serves as a fulcrum, and the leverage developed between the two gripping members 20 and 24 as a result of the lifting force applied to the handle 24 creates a sizeable gripping force between the two gripping shoes 32 and 42. This force maintains the gripping faces 34 and 44 of the shoes 32 and 42 in contact with the end walls 6 of the battery case 2. Many batteries B have a slight rim around their top walls 8 and the gripping shoes 32 and 42 may engage the bottom edge of such a rim. This further prevents the shoes 32 and 42 from slipping off of the end walls 6.

Not only is the device A capable of gripping batteries having terminals 12 at their tops, but it is also capable of gripping batteries having side-mounted terminals.

This invention is intended to cover all changes and modifications of the example of the invention herein chosen for purposes of the disclosure which do not constitute departures from the spirit and scope of the invention.

What is claimed is:

1. A tool for lifting a battery or other object having upright walls, said tool comprising: a first gripping member in the form of a rigid and unitary structure having an upright end leg and a handle extended from the upper end of the end leg with the handle being presented at an angle to that end leg, the end leg having a gripping surface at its lower end; a second gripping member in the form of a rigid and unitary structure having an upright end leg and a connecting portion extended generally horizontally from the upper end of that end leg and being located below the handle on the first gripping member, the end leg of the second gripping member having a gripping surface at its lower end with that gripping surface being located opposite the gripping surface on the end leg of the first member, the connecting portion of the second member being located adjacent to the end leg of the first member where the connecting portion is provided with a slot and a plurality of spaced apart notches which open into the slot, the slot extending in the direction of the connecting portion; and a pin extended through the slot in the connecting portion and secured in the end leg of first member, the pin being sized to fit in the notches of the slots to enable the first member to pivot relative to the second member at any one of the notches, whereby an upwardly directed force exerted on the handle will cause the gripping surfaces of the two gripping members to move together so that the battery may be clamped between them, the pin further being sized to slide along the slot from one notch to the other so that the spacing between the end legs of the two gripping members may be varied, whereby the tool may be adjusted to accommodate batteries of varying widths.

2. A tool according to claim 1 wherein the first gripping member further includes a gripping shoe attached to the lower end of its upright leg, and the second gripping member further includes a gripping shoe attached to the lower end of its upright leg, the two gripping shoes being wider than their respective end legs and having the gripping surfaces thereon.

3. A tool according to claim 2 wherein each gripping surface is composed of a plurality of horizontal grooves.

4. A tool according to claim 1 wherein the notches open downwardly into the slot.

5. A tool according to claim 1 wherein the first and second gripping members are formed from bar stock of rectangular cross-sectional configuration, whereby the first and second gripping members have major and minor surface areas; and wherein the major surface areas of the handle are presented horizontally; wherein the major surface areas of the upright leg on the first member at the lower end thereof are presented vertically and generally normal to the longitudinal axes of the handle; wherein the upright leg of the first member is twisted intermediate its ends so that the major surface areas of the twisted portion are oriented 90° with respect to the major surface areas at the lower end; and wherein the connecting portion of the second member extends across the twisted portion of the upright leg on the first member and has its major surface areas oriented vertically.

6. A tool according to claim 5 wherein the bar stock of the connecting portion is twisted near the end leg of the second gripping member such that the major surface areas of the connecting portion beyond the twist are presented horizontally.

7. A tool according to claim 6 wherein the major surface areas of the bar stock in the end leg of the second gripping member are presented parallel to the gripping surface for the second gripping member.

8. A tool according to claim 1 and further comprising a compression spring attached to the handle of the first member and extended downwardly therefrom toward the connecting portion of the second member, the lower end of the spring being aligned with, yet detached from, the connecting portion of the second member.

9. A tool according to claim 1 wherein the pin has a head which overlies the connecting portion of the second gripping member and is large enough to prevent the pin from passing out of the slot and notches.

10. A tool for lifting an object, such as a battery, having spaced apart end walls, said tool comprising: a first gripping member in the form of a rigid and unitary structure having an upright end leg, a gripping shoe at the lower end of the end leg and adapted to be positioned against the end wall of the object to be lifted, and a handle extended generally horizontally from the upper end of end leg; a second gripping member in the form of a rigid and unitary structure having an upright end leg, a gripping shoe at the lower end of the end leg and presented toward the gripping shoe of the first gripping member so as to be adapted to be positioned against the other end wall of the object to be lifted, and a connecting portion extended generally horizontally from the upright end leg of the second member in generally the same direction as the handle of the first member, the connecting portion extending across the upright leg on first member and having a slot located adjacent to the leg of the first member, the slot being elongated in the horizontal direction, the connecting portion further having notches opening downwardly into the slot; and a pivot pin secured in the upright leg of the first member and extended through the slot in the connecting portion of the second member to enable the first member to pivot relative to the second member, the pin being sized to fit into the notches.

* * * * *